J. F. GLIDDEN.

BARBED FENCE-WIRE.

No. 6,913.

Reissued Feb. 8, 1876.

WITNESSES

Robert Everett

George E. Wheaul.

INVENTOR

Joseph F. Glidden.

Gibson & Smith Co.

ATTORNEYS.

UNITED STATES PATENT OFFICE.

JOSEPH F. GLIDDEN, OF DE KALB, ILLINOIS.

IMPROVEMENT IN BARBED FENCE-WIRES.

Specification forming part of Letters Patent No. 150,683, dated May 12, 1874. Reissue No. 6,913, dated February 8, 1876. Application filed January 26, 1876.

DIVISION A.

*To all whom it may concern:*

Be it known that I, JOSEPH F. GLIDDEN, of De Kalb, in the county of De Kalb and State of Illinois, have invented a new and useful Improvement in Wire Fences, of which the following is a full, clear, and exact description.

Figure 1:
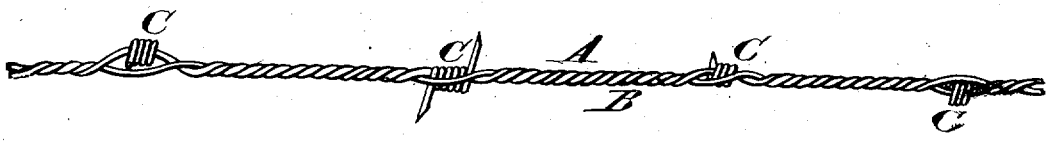
Figure 2:
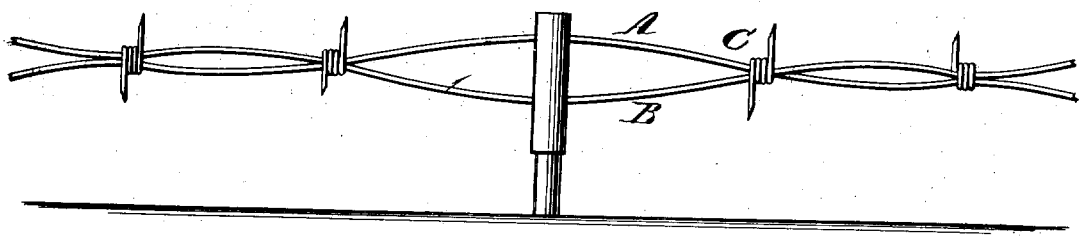
Figure 3:
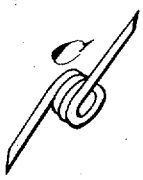

Figure 1 shows my barb attached to and through a two-strand twisted fence-wire. Fig. 2 is an illustration of the same barb applied externally around two fence-wires distended between the barbs. Fig. 3 is a view of my barb.

My invention under this division relates to that class of wire fences in which the barbs or spurs are attached to the wires; and it consists in a short wire with pointed ends coiled around and compressed about a fence-wire, as will be hereinafter described.

Prior to my invention barbs for fence-wires were usually constructed in the form of spurs attached to spools, through which the wire was passed, or of double-ended spurs or similar devices which were passed over the end of such wire and clamped or soldered in position. Sometimes also such spurs have been passed through a perforation in the wire.

My invention obviates many objections to the use of the devices above named, inasmuch as it enables the fence-builder to attach his barbs at such points upon the fence-wire as he may deem proper without the necessity of perforating the wire or of passing them over the end thereof.

In the annexed drawings, A B designate two fence-wires, and C my coiled barb attached thereto. D designates a single fence-wire with my barb attached.

It is obvious that my peculiar barb is adapted for attachment to one fence-wire only or to many fence-wires united together.

My barb consists of a short wire pointed at each end, and wrapped or coiled around a fence-wire, or around such number of wires as the fence-builder shall see fit to unite together.

It is obvious that the number of coils or twists made around a fence-wire by my barb is not material, and I do not limit my claim to any given number of such coils. If such coils be sufficiently numerous, or so arranged that the wire is pressed closely by them, the object in view will be secured—to wit, preventing the barbs from turning.

By my invention I am able to apply the barbs to fence-wires which have been stretched in fences, as well as to apply them to the fence-wires while constructing the fences.

What I claim as new, and desire to secure by Letters Patent, is—

In combination with a fence-wire, a barb formed of a short piece of pointed wire secured in place upon the fence-wire by coiling between its ends, forming two projecting points, substantially as specified.

In testimony that I claim the above I have hereunto subscribed my name in the presence of two witnesses.

JOSEPH F. GLIDDEN.

Attest:
JOHN F. ACKER,
EUGENE W. JOHNSON.